July 3, 1928.
A. G. JACOBSON
GRIPPER MECHANISM
Filed April 12, 1926
1,675,559
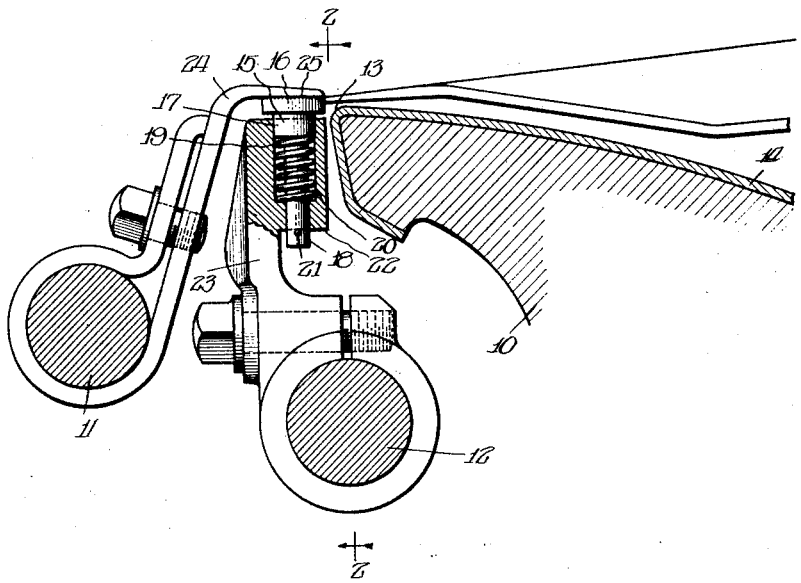
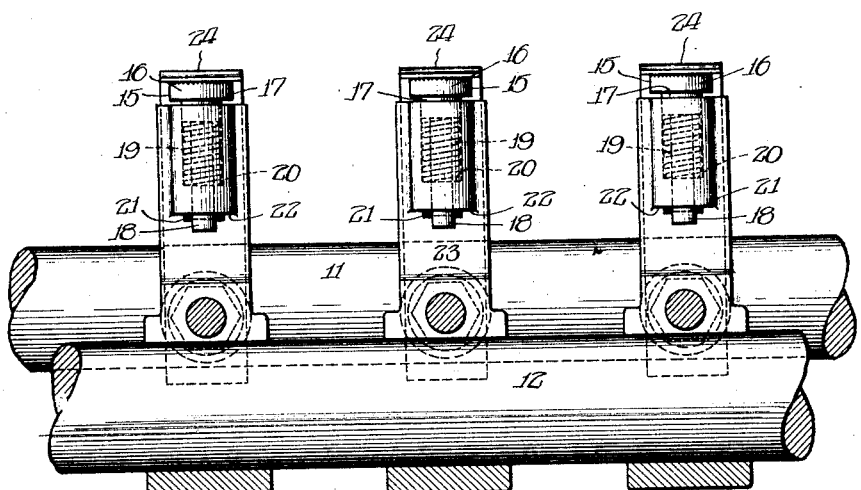
Inventor:
Arthur G Jacobson, Patented July 3, 1928.

1,675,559

UNITED STATES PATENT OFFICE.

ARTHUR G. JACOBSON, OF CHICAGO, ILLINOIS, ASSIGNOR TO MIEHLE PRINTING PRESS & MANUFACTURING COMPANY, OF CHICAGO, ILLINOIS, A CORPORATION OF ILLINOIS.

GRIPPER MECHANISM.

Application filed April 12, 1926. Serial No. 101,349.

This invention relates to gripper mechanism.

One object of the invention is to provide gripper mechanism by means of which a sheet may be gripped with a substantially uniform pressure without nicety of gripper adjustment.

Another object is to provide gripper mechanism in which a fed sheet may be properly gripped without the necessity of giving the grippers the nicety of adjustment required when a solid pad is used.

Another object is to provide gripper mechanism in which, when there is a relative movement between the gripper members, the position of the gripped sheet will not be disturbed.

These and other objects are accomplished by means of the arrangement shown on the accompanying sheet of drawings, in which—

Figure 1 is a vertical sectional view of my improved gripper mechanism including a plurality of gripper members and showing their relative position with respect to a printing press cylinder and the means for supporting the gripper members, and Figure 2 is a detail elevational view taken in the plane of line 2—2 of Figure 1.

The various novel features of the invention will be apparent from the following description and drawings, and will be particularly pointed out in the appended claim.

Referring to the figures of the drawings, it will be noted that I have disclosed my invention in connection with a printing press cylinder 10 in the gap of which there is mounted an operating shaft 11 and a supporting shaft 12. The gripper mechanism proper is mounted on said shafts within the cylinder gap adjacent one edge 13 of the sheet receiving surface 14 of the cylinder.

Heretofore, so far as applicant is aware, only solid gripper pads have been provided and when referring to solid gripper pads, such pads as rubber, felt, paper, as well as metal, are included. When solid gripper pads are used, it is necessary to make a very nice adjustment of the gripper fingers which are located at various points along the operating shaft so that said gripper fingers may press down upon the sheet with a uniform pressure. Such nicety of adjustment not only requires the expenditure of a great deal of time but is rather difficult to secure and maintain, and also grip the sheet in a manner not to disturb its position on the cylinder. My present invention contemplates overcoming the requirement of nicety of adjustment of the gripper fingers, and at the same time, the gripper mechanism is designed to grip a sheet with a uniform pressure and without disturbing its position on the cylinder.

One embodiment of the invention takes the form disclosed on the sheet of drawings wherein the gripper pad member 15 is mounted for bodily movement in a straight line, said pad member 15 including a head 16, a guide collar portion 17, and a shank portion 18. The movably mounted gripper pad member 15 is movably mounted in a recess 18 in a bracket 23, said recess also receiving a coiled spring 19 surrounding the shank 18 and interposed between the bottom 20 of the recess and the collar 17. The outward movement of the movably mounted gripper pad 15 is limited by any suitable pin or key 21 which extends through said shank 18 and is engageable with a shoulder portion 22 formed on the bracket 23 which bracket in turn is adjustably mounted upon the supporting shaft 12. The spring 19 presses the gripper pad member 15 outwardly, the spring being compressed an increased amount when the gripper pad is pressed inwardly due to pressure transmitted thereto from the associated gripper finger or member 24 adjustably mounted upon the operating shaft 11.

From the arrangement described, it is apparent when the upper gripper member 24 presses down upon a sheet interposed between said upper gripper member 24 and the gripper pad 15 that if said upper gripper member 24 is given an excessive movement due, for example, to a rough adjustment of same on the shaft 11, such will be compensated for by the inward bodily yielding movement of the gripper pad 15. At the same time, the gripped sheet of paper will be gripped with substantially a uniform pressure throughout. An adjacent pair of gripper members may have another relatively rough adjustment in which the gripper pad may be depressed a lesser or greater amount, the gripping pressure being substantially uniform. Thus it will be seen that if the various gripper fingers 24 distributed along the operating shaft 11 are given a relatively rough adjustment as distinguished from a nice adjustment, the gripped sheet nevertheless will be gripped by the various gripper members with a substantially uniform gripping pressure. To prevent disturbing the position of the gripped sheet on the cylinder due to a possible relative movement between the gripper pad 15 and the associated gripper finger 24, the gripper pad member 15 has its head 16 provided with a knurled gripping surface 25 while the gripping surface of the finger 24 is smooth or polished. In this way there may be a relative movement between the gripper members in question without disturbing the position of the sheet on the cylinder.

By means of the arrangement herein disclosed, the objects of this invention are accomplished. It is my intention to cover all modifications of the invention falling within the spirit and scope of the following claim.

I claim:

In a gripping mechanism, a support adjustably fixed relative to the surface of a drum, a gripper member mounted on said support yielding in a substantially radial direction only and presenting a roughened plane gripping surface, said gripper member having a limited outward movement, said surface in its limited outward position lying substantially in the plane of sheets to be gripped; a pivoted cooperating gripper having a relatively smooth plane surface, said last named surface being so disposed relative to the pivotal center on which it turns that its plane substantially coincides with the plane of the surface of said roughened gripper and the plane of said sheets when said grippers initially engage, said pivoted gripper being capable of slight additional movement to depress in its gripping action said roughened gripper, whereby a sheet is held immovably on said roughened surface as initially engaged while said smooth gripper slides slightly over the surface of said sheet.

Signed at Chicago, Illinois, this 9th day of April, 1926.

ARTHUR G. JACOBSON.